US007962113B2

(12) United States Patent
Gao et al.

(10) Patent No.: US 7,962,113 B2
(45) Date of Patent: Jun. 14, 2011

(54) RECEIVER WITH MULTI-TONE WIDEBAND I/Q MISMATCH CALIBRATION AND METHOD THEREFOR

(75) Inventors: Li Gao, Austin, TX (US); Richard A Johnson, Buda, TX (US); James M. Nohrden, Lakeway, TX (US)

(73) Assignee: Silicon Laboratories Inc., Austin, TX (US)

( * ) Notice: Subject to any disclaimer, the term of this patent is extended or adjusted under 35 U.S.C. 154(b) by 1348 days.

(21) Appl. No.: 11/263,280

(22) Filed: Oct. 31, 2005

(65) Prior Publication Data

US 2007/0099570 A1     May 3, 2007

(51) Int. Cl.
*H04B 1/10*     (2006.01)
(52) U.S. Cl. ............... 455/296; 455/278.1; 455/63.1; 375/346; 375/350
(58) Field of Classification Search .......... 455/424, 455/425, 456.5, 456.6, 561, 550.1, 575.1, 455/501, 63.1, 67.11, 115.1, 115.2, 278.1, 455/302, 285, 296; 375/231, 229, 260, 350, 375/332, 346, 348, 340, 341, 316; 370/500, 370/503, 509, 516, 525, 203, 338, 232; 342/420, 342/421
See application file for complete search history.

(56) References Cited

U.S. PATENT DOCUMENTS

| | | | |
|---|---|---|---|
| 3,748,602 A * | 7/1973 | Delfrate et al. ............ 333/28 R |
| 4,562,469 A | 12/1985 | Graham | |
| 5,142,574 A | 8/1992 | West et al. | |
| 5,163,164 A * | 11/1992 | Tults .......................... 455/182.3 |
| 5,357,257 A * | 10/1994 | Nevin ............................ 342/165 |
| 6,246,431 B1 | 6/2001 | Mycynek | |
| 6,363,102 B1 * | 3/2002 | Ling et al. ....................... 375/147 |
| 6,874,115 B1 | 3/2005 | Laneman et al. | |
| 7,020,226 B1 * | 3/2006 | Kirkland ........................ 375/355 |
| 7,127,217 B2 | 10/2006 | Tuttle | |
| 7,174,146 B2 * | 2/2007 | Wu et al. ......................... 455/296 |
| 7,251,291 B1 * | 7/2007 | Dubuc et al. ................... 375/296 |
| 7,392,015 B1 * | 6/2008 | Farlow et al. ............... 455/67.11 |
| 2002/0101840 A1 * | 8/2002 | Davidsson et al. ........... 370/330 |
| 2003/0007574 A1 * | 1/2003 | Li et al. ........................... 375/316 |
| 2003/0095589 A1 * | 5/2003 | Jeong ............................. 375/147 |
| 2003/0123534 A1 * | 7/2003 | Tsui et al. ...................... 375/229 |
| 2004/0002318 A1 * | 1/2004 | Kerth et al. ................... 455/302 |
| 2004/0106380 A1 * | 6/2004 | Vassiliou et al. ............... 455/73 |
| 2004/0201508 A1 | 10/2004 | Krone et al. | |
| 2004/0203472 A1 * | 10/2004 | Chien .............................. 455/68 |
| 2005/0070236 A1 | 3/2005 | Paulus | |
| 2005/0070239 A1 | 3/2005 | Paulus | |
| 2005/0248478 A1 * | 11/2005 | Ling .............................. 341/118 |

(Continued)

OTHER PUBLICATIONS

U.S. Appl. No. 60/603,709, filed Apr. 2004, Young et al.*

(Continued)

*Primary Examiner* — Duc Nguyen
*Assistant Examiner* — Charles Chow
(74) *Attorney, Agent, or Firm* — Polansky & Associates, P.L.L.C.; Paul J. Polansky; R. Michael Reed

(57) ABSTRACT

In one embodiment, a method provides multiple-tone wideband I/Q mismatch calibration. A plurality of calibration frequencies is selected within a channel. A calibration tone is applied to the channel at each of the plurality of calibration frequencies. An I/Q mismatch is estimated at each of the plurality of calibration frequencies. An n-th order filter is constructed to compensate received signals relative to the estimated I/Q mismatch related to each calibration frequency.

22 Claims, 8 Drawing Sheets

U.S. PATENT DOCUMENTS

| | | | |
|---|---|---|---|
| 2005/0260949 A1* | 11/2005 | Kiss et al. | 455/67.14 |
| 2006/0083335 A1* | 4/2006 | Seendripu et al. | 375/332 |
| 2006/0111071 A1* | 5/2006 | Paulus et al. | 455/302 |
| 2006/0262872 A1* | 11/2006 | Green et al. | 375/260 |
| 2007/0123188 A1* | 5/2007 | Mo et al. | 455/302 |
| 2008/0160916 A1 | 7/2008 | Jagger et al. | |

OTHER PUBLICATIONS

Actions on the Merits in copending U.S. Appl. No. 11/263,279 and U.S. Appl. No. 11/523,440.

Actions on the Merits in copending U.S. Appl. No. 11/263,279 and U.S. Appl. No. 11/523,440 as of Sep. 25, 2009.

Actions on the Merits in copending U.S. Appl. No. 11/263,280 and U.S. Appl. No. 11/523,440 as of Mar. 2, 2010.

Actions on the Merits in copending U.S. Appl. No. 11/263,280 and U.S. Appl. No. 11/523,440 as of Jun. 18, 2010.

Actions on the Merits in copending U.S. Appl. No. 11/263,279 and U.S. Appl. No. 11/523,440 as of Sep. 16, 2010.

* cited by examiner

Input to RF Port of IQ Mixer

Input to LO Port of IQ Mixer

Output from RF-LO IQ Mixer

RECEIVER WITH MULTI-TONE WIDEBAND I/Q MISMATCH CALIBRATION AND METHOD THEREFOR

CROSS-REFERENCE TO RELATED APPLICATION

The present application is related to co-pending U.S. patent application entitled "RECEIVER WITH MULTI-TONE WIDEBAND I/Q MISMATCH CALIBRATION AND METHOD THEREFOR," application Ser. No. 11/263,280, invented by Li Gao, Richard A. Johnson, and James M. Nohrden, and filed on Oct. 31, 2005, which is incorporated herein by reference in its entirety and which assigned to the assignee hereof.

BACKGROUND

1. Field of the Disclosure

The present disclosure is generally related to radio frequency receivers, and more particularly, to correction of received signals in receiver systems.

2. Description of the Related Art

Modern communications systems transmit and receive information by modulating a radio frequency (RF) carrier signal with a data signal. The data signal can be at a much lower frequency than the RF signal. Such systems can then demodulate the RF signal to recover the data signal.

Many RF receiver systems use some form of heterodyning to convert a received RF signal to a lower frequency signal (sometimes called an intermediate frequency signal), which may be easier to filter. Generally, heterodyning refers to a process of mixing (or multiplying) a first signal with a second signal having a frequency that is close to that of the first signal. In this instance, the RF signal is often multiplied with a local oscillator signal (LO signal). Mixing the two signals results in two signals, a first signal having a frequency equal to the sum of the RF frequency and the LO frequency, and a second signal having a frequency equal to the difference between the RF and the LO frequencies. The first frequency is higher than the RF or LO frequency, and is usually filtered readily using a simple low-pass filter. The difference frequency is the intermediate frequency (IF), which can be manipulated using fixed frequency filters.

Unfortunately, typical heterodyne-based systems are susceptible to a phenomenon referred to as imaging. Imaging refers a signaling phenomenon where two different RF signals are translated to the same intermediate frequency, thereby causing interference. In general, a desired RF frequency $f_{RF}$ differs from a given LO signal frequency $f_{LO}$ by the IF frequency $f_{IF}$. A desired radio frequency may lie either above or below the LO signal frequency. However, due to its symmetric properties, heterodyning systems sometimes select any RF signal differing from $f_{LO}$ by $f_{IF}$, regardless of whether the RF signal lies above or below $f_{LO}$. For example, if a desired RF signal has a frequency of 1.01 GHz and the LO signal has a frequency of 1.00 GHz, the two signals can be mixed to produce an IF signal having an IF frequency of 10 MHz. However, if there is a second RF signal with a frequency of about 990 MHz, the receiver will mix both the 1.01 GHz and the 990 MHz signals to the same frequency of 10 MHz, thereby causing interference with the desired signal. The image frequency can be, for example, the frequency corresponding to the sum of $f_{LO}$ and $f_{IF}$.

To prevent interference with the desired RF signal, some communication systems use quadrature receiver architectures for splitting the desired RF signal into two paths and for mixing each path with a respective function of a local oscillator signal, where the respective functions have a ninety-degree phase difference. One of the paths is typically referred to as an in-phase (I) signal path, and the other path is typically referred to as a quadrature (Q) signal path.

If the phase relationship of the Q signal is exactly 90 degrees out of phase with the I signal, and if the I path and the Q path circuits are identical in terms of amplitude and phase, then the image signal is perfectly rejected from the desired signal. Fortunately, Quadrature IF mixing allows for cancellation of image signals without expensive and bulky rejection filters. However, if any non-idealities exist in the signals (imperfect 90 degree phase difference) or if the I and Q paths are imbalanced or mismatched (phase, amplitude, and so on), then the gain and phase of the I/Q path circuit will cause the image signal to leak into the desired signal, resulting in imperfect image cancellation.

To improve image rejection or cancellation, some receivers utilize a calibration tone to calibrate the receiver to account for any gain and/or phase imbalances between the two paths. For example, some systems may use a calibration tone as an input to a quadrature mixer during a calibration mode. A residual image signal can then be measured to derive an IQ mismatch correction factor to be applied to the I signal path and/or to the Q signal path to adjust the gain and phase of one path to improve image rejection.

Mismatches between the I and Q signal paths and image rejection in general are very important in RF transmission systems with a plurality of transmitters and receivers and with receivers wherein $f_{RF} \pm f_{LO}$ also lies in the band of interest, because the image channel can be much stronger than the desired channel and the image channel cannot be filtered easily because it is in-band. Various calibration schemes have been proposed to compensate the I/Q gain/phase mismatch based on achievable native I/Q matching in analog circuitry; however, most of such calibration schemes assume that the gain/phase mismatches are frequency independent across the entire desired tuning range of the local oscillator.

However, in modern communication systems, wide channel bandwidths are often used because they provide higher data rates than narrow channel bandwidths, and wider channels can more easily exhibit frequency dependent gain/phase mismatches. For example, in television broadcasting, these wider bandwidths are evident because channel widths are commonly 6 MHz to 8 MHz.

SUMMARY

In one embodiment, a method is provided wherein a plurality of calibration frequencies is selected within a channel. A calibration tone is applied to the channel at each of the plurality of calibration frequencies. An I/Q mismatch is estimated at each of the plurality of calibration frequencies. An n-th order digital filter is constructed to compensate received signals relative to the estimated I/Q mismatch related to each calibration frequency. In one embodiment, a local oscillator generates the calibration tone. In another embodiment, a calibration tones generator generates the calibration tone.

In another embodiment, a receiver for use in multi-channel systems has a calibration signal generator, a processor, and a digital filter. The calibration signal generator is adapted to generate a plurality of calibration tones at selected frequencies. The processor is coupled to the calibration signal generator and is adapted to estimate an I/Q mismatch error at each of the selected frequencies. A digital filter is coupled to a channel and to the processor and is adapted to compensate received signals relative to the I/Q mismatch error at each calibration frequency.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
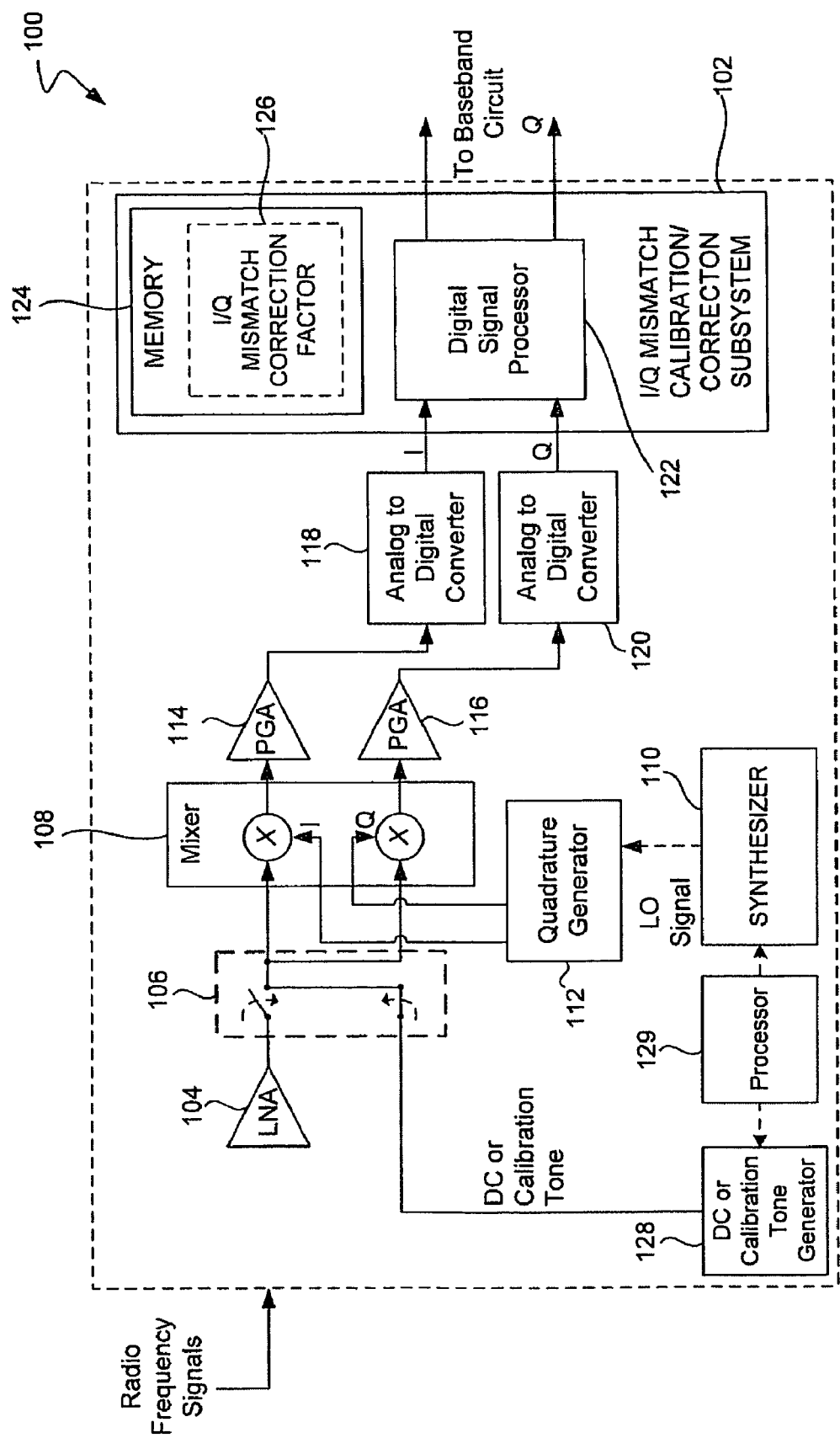
FIG. 1 is a simplified block diagram of a receiver system according to an embodiment of the present invention.

FIG. 1 is a simplified block diagram of a receiver system 100 according to an embodiment of the present invention. The receiver system 100 includes an I/Q mismatch calibration/correction subsystem 102. Receiver system 100 may be configured to operate within any communication system adapted to receive information via radio frequency (RF) signals. For example, receiver system 100 can be used within a television receiver circuit, a radio tuner circuit, a video cassette recorder receiver circuit, a satellite or cable video set-top box receiver circuit, or any other wireless communication device, including, for example, a cellular telephone handset, a wireless data modem, and the like. In general, receiver system 100 is adapted to receive an incoming radio frequency (RF) signal from an RF interface (not shown), which may include elements such as an antenna, filters, switches, and amplifier stages. As used herein, "radio frequency signal" means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. Receiver system 100 may also be configured to down-convert the received RF signal to an intermediate frequency (IF) signal and to provide the IF signal to a baseband circuit (not shown) for demodulation and decoding of the underlying baseband signal.

In some embodiments, receiver system 100 may be a subsystem of a transceiver that may further include a transmitter system (not shown in FIG. 1). Such a transmitter system may be configured to receive a modulated baseband signal from a baseband circuit and to generate a modulated carrier at the higher intermediate frequency (IF). The transmitter system may also be configured to up-convert the resultant IF signal and provide a modulated radio frequency (RF) output signal to the RF interface, which may include transmission power amplifiers and filters in addition to the RF reception elements.

As shown, receiver system 100 includes a low noise amplifier (LNA) 104 connected through a switch 106 to an in-phase/quadrature (I/Q) mixer 108. A local oscillator circuit 110 provides a receiver local oscillator (RX LO signal) signal to quadrature generator 112, which is to I/Q mixer 108 to provide quadrature LO signals. The in-phase (I) and quadrature (Q) outputs of I/Q mixer 108 are connected to programmable gain amplifiers (PGAs) 114 and 116, respectively. PGAs 114 and 116 are connected to analog-to-digital converters (ADCs) 118 and 120. The output of the ADCs 118 and 120 are provided to a digital signal processor 122 within I/Q mismatch calibration/correction subsystem 102. The digital signal processor 122 determines I/Q mismatch correction factors 126 corresponding to a plurality of frequency bands to tune or calibrate the receiver 100 to desired frequency channels. In one embodiment, the digital signal processor (DSP) 122 is connected to a memory 124 for storing the I/Q mismatch correction factors 126, which may be a complex correction factor.

During startup or in calibration mode, a DC and calibration tone generator 128 generates a DC signal or a calibration tone signal at one or more desired frequencies. A processor 129 selects calibration tone frequencies and communicates with both the DC and calibration tone generator 128 and the local oscillator 110 to trigger generation of a calibration tone generator output (DC signal or calibration tone signal) and of a LO signal, respectively. For example, when producing calibration tones, the processor 129 triggers the DC and calibration tone generator 128 to input the one or more calibration tones one at a time to the mixer 108 through switch 106. Alternatively, when producing a DC signal, the processor 129 triggers the DC and calibration tone generator to input the DC signal to the mixer 108 via the switch 106. The DC and calibration tone generator 128 may include a power supply, an oscillator, one or more dividers, a counter, and possibly logic circuitry for generating a calibration tone at a desired frequency.

The local oscillator 110 utilizes the calibration clock signal to generate a local oscillator signal (LO signal) for use by the quadrature generator 112 to produce I and Q components of the LO signal at a calibration frequency and phase. The Q component of the LO signal that is generated by quadrature generator 112 is approximately 90 degrees out of phase with the I component. The I and Q components of the LO signal are mixed with the calibration tone by I/Q mixer 112 to produce an I and Q signal calibration pair at a desired IF frequency. The I and Q signal calibration pair is amplified by PGAs 114 and 116 and input into ADCs 118 and 120, and then processed by the DSP 122 to estimate a I/Q mismatch correction factor 126, which can be stored in memory 124. When multiple calibration tones are used, the DSP 122 estimates an I/Q mismatch correction factor 126 for each calibration tone, and the resulting set of I/Q mismatch correction factors 126 can be stored in the memory 124.

During one mode of operation, the processor 129 triggers the DC and calibration tones generator 128 to produce calibration tones, which are input to the mixer 108 via switch 106. The processor 129 also triggers the local oscillator 110 to produce a LO signal, which is input to the mixer 108 via the quadrature generator 112. The I and Q components of the LO signal and the calibration tones are mixed by mixer 108 to produce I and Q components that can be used by the calibration and error correction subsystem 102 to estimate an I/Q mismatch correction factor at each of the calibration tone frequencies.

In a second mode of operation, the processor 129 triggers the DC and calibration tones generator 128 to produce a DC signal that is input to the mixer 108 via the switch 106. The processor also triggers the local oscillator 110 to produce a LO signal (a calibration tone) at a particular frequency, which is input to the mixer 108 through the quadrature generator 112. The I and Q components of the LO signal from the quadrature generator 112 are mixed with the DC signal to produce I and Q components that can be used by the calibration and error correction subsystem 102 to estimate the I/Q mismatch correction factor at a particular frequency, namely the frequency of the LO signal.

In one embodiment, the processor 129 causes the local oscillator 110 to produce a calibration tone at an in-band frequency corresponding to a carrier of an image signal. For example, if the image channel is a television channel, color, audio, and other information are modulated onto different carrier frequencies within the channel. The processor 129 is adapted to control the local oscillator 110 to provide a calibration tone at one or more of the carrier frequencies of the interfering image channel to produce I/Q component signals, which the IQ mismatch calibration/correction subsystem 102 can use to estimate correction factors at each of the interfering carrier frequencies. A digital filter, such as an infinite or finite impulse response filter, can be constructed using the estimated I/Q mismatch correction factors to reject undesired interference at the one or more carrier frequencies.

It should be understood that either the DC and calibration tone generator 128 or the local oscillator 110 can be used to produce signals for use as calibration tones. The processor 129 can trigger generation of the signals, select frequencies at which the signals should be generated, and control, for example, spacing of the calibration tones within a channel.

In general, the processor 129 is adapted to provide a calibration tone by controlling the DC or calibration tones generator 128 and/or the local oscillator 110 to generate the calibration tone at multiple frequencies within a frequency band (channel), at a select frequency within each frequency band of a plurality of frequency bands, or at selected frequencies within each of a plurality of frequency bands, depending on the specific implementation. Alternatively, the processor 129 is adapted to provide a calibration tone at a specific interfering image frequency so that the I/Q mismatch calibration/correction subsystem 102 can estimate the correction factor to cancel or reject images at a given frequency.

During normal operation of receiver system 100, the local oscillator 110 utilizes a receiver clock reference signal to produce a local oscillator signal (LO signal) at a selected frequency for use by the quadrature generator 112 to produce I and Q signals at a desired frequency and phase. In one embodiment, the local oscillator 110 is a phase locked loop (PLL) oscillator that is locked to a clock signal labeled "RECEIVER CLOCK REFERENCE."

In general, though the processor 129 is shown as a separate element, it should be understood that the processor 129 can be included within the calibration and error correction subsystem 102. Alternatively, the processor 129 can be a separate circuit component.

When an RF signal is received by the RF interface, the received RF signal is amplified by LNA 104. The amplified RF signal is passed through switch 106 and applied to both the I and Q portions of I/Q mixer 108. The quadrature LO signals generated by quadrature generator 112 are 90 degrees out of phase, and are mixed with the incoming RF signal by I/Q mixer 108 to produce a I and Q signal pair at a desired IF frequency. The IF I and Q signal pair is amplified by PGAs 114 and 116 and input into ADCs 118 and 120. The ADCs 118 and 120 convert the I and Q signals into respective I and Q data streams which are input into DSP 122 of I/Q mismatch calibration/correction subsystem 102I/Q mismatch calibration/correction subsystem 102 for processing. As used herein, the portions of receiver system 100 that separately process and propagate the I and Q signals, respectively, are referred to as the I and Q channels (or the I and Q signal paths).

In one embodiment, ADCs 118 and 120 can be implemented as dual Analog-to-Digital converters. In another embodiment, the ADCs 118 and 120 can be combined into a single ADC adapted to accept complex inputs. In one embodiment, the ADCs can be sigma-delta ADCs.

The IF signal produced by mixing the received RF signal with the quadrature LO signal includes a useful desired signal and an undesired image signal. The image signal may interfere with processing of the useful signal and may need to be suppressed or rejected.

Calibration Procedure

Figure 2:
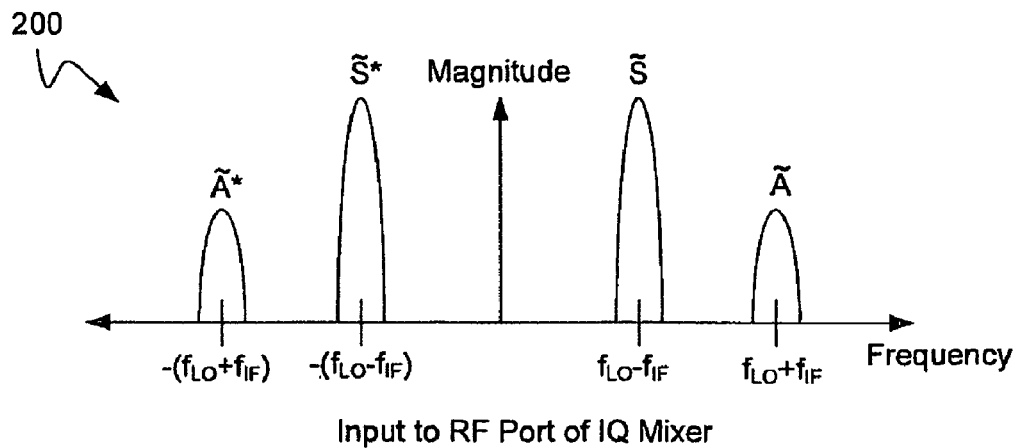
FIG. 2 is a frequency domain graph illustrating a simplified example of the imaging phenomenon within a complex heterodyning receiver system.
Figure 2:
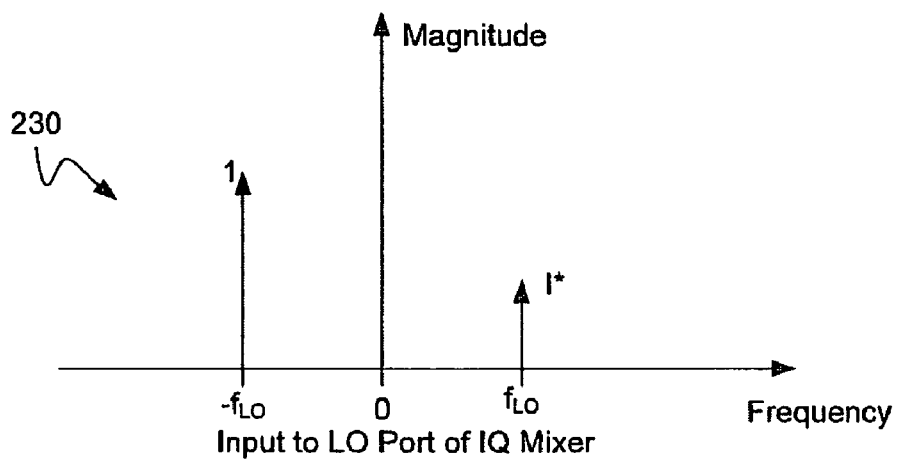
Figure 2:
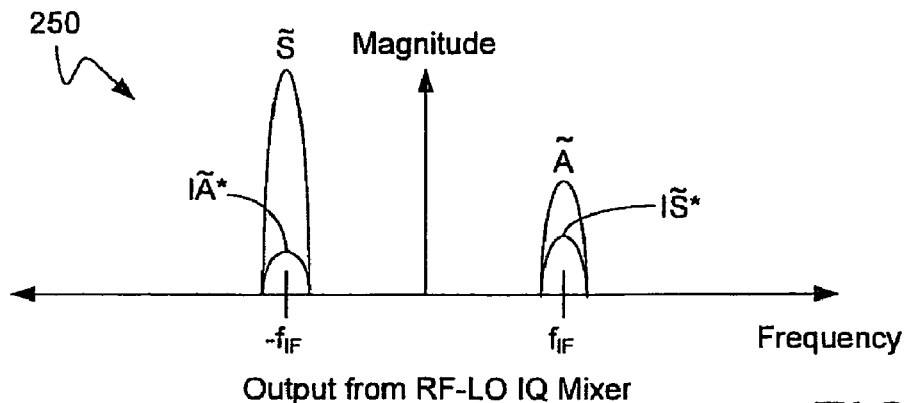

FIG. 2 are frequency domain graphs 200, 230 and 250 illustrating a simplified example of the imaging phenomenon within a complex (I and Q) heterodyning receiver system at the inputs and the outputs of an I/Q mixer 108. Graphs 200, 230 and 250 generally illustrate a spectral distribution of an exemplary combination of signals at the input to and output of I/Q mixer 108. At the input to I/Q mixer 108, a complex modulation signal of interest ($\tilde{S}$) is modulated to a carrier frequency $f_{LO}-F_{IF}$ while an unrelated complex modulation signal ($\tilde{A}$) is modulated to a carrier frequency at the image frequency $F_{LO}+F_{IF}$. In one embodiment, an intermediate frequency ($f_{IF}$) may be chosen to be the same frequency as the channel spacing frequency for a particular RF communication standard, such as 200 kHz. In such an embodiment, signal $\tilde{A}$ may represent a signal in a different channel than signal $\tilde{S}$ and may have a larger magnitude than signal $\tilde{S}$. In the illustrated example, signal $\tilde{A}$ is two channels away from signal $\tilde{S}$ and may be referred to as an alternate channel signal relative to signal $\tilde{S}$. As signals $\tilde{S}$ and $\tilde{A}$ are complex, conjugate signal versions $\tilde{S}^*$ and $\tilde{A}^*$ exist in the negative frequency plane at frequencies $-(f_{LO}-F_{IF})$ and $-(f_{LO}+f_{IF})$, respectively.

Graph 230 illustrates the complex frequency spectrum of the quadrature LO signal at the input of the local oscillator port of the I/Q mixer 108.

Mixing a given signal with a frequency conversion signal (such as a single-frequency tone, for example) results in a new signal. The new signal is formed from component frequencies corresponding to sums and differences of the signal's frequencies with the frequencies of the frequency conversion signal. This multiplying of the input signal with the LO in the time domain is mathematically equivalent to convolving the input signal with the LO in the frequency domain. Thus, mixing signals $\tilde{S}$ and $\tilde{A}$ and their conjugates with the LO signal at $f_{LO}$ in I/Q mixer 108 results in signals at frequencies corresponding to the sums and differences of the original signal frequencies with $f_{LO}$.

Mixing the input signal shown in graph 200 with the I and Q components of the LO signal shown in graph 230 results in signal $\tilde{S}$ and signal $\tilde{A}$ being translated to $-f_{IF}$ and $f_{IF}$, respectively, shown in graph 250. Such mixing also results in $\tilde{S}^*$ and $\tilde{A}^*$ to be translated to frequencies on the order of $-2f_{LO}$ that subsequently may be filtered from the mixer output. However, addition of complex energy at $+f_{LO}$ results in the image signal $\tilde{A}^*$ being mixed onto the same frequency location as signal $\tilde{S}$ and conversely, image signal $\tilde{S}^*$ being mixed onto the same frequency location as signal $\tilde{S}$. Such mixing also results in $\tilde{S}$ and $\tilde{A}$ to be translated to frequencies on the order of $+2f_{LO}$ that subsequently may be filtered from the mixer output The conjugate components are attenuated by a native image rejection factor I, such that the magnitude of $\tilde{A}^*$ that interferes with $\tilde{S}$ at $-f_{IF}$ is reduced. In an ideal quadrature receiver system lacking gain or phase differences between the I and Q signal paths (i.e., a system in which, for example, I/Q mixer 108 and all downstream components such as PGAs 114 and 116 and ADCs 118 and 120 are perfectly matched), native image rejection factor I may be zero, resulting in no mixing of image signals onto desired signals. However, in real receiver systems, the I-component is always nonzero due to gain and phase imbalances. This may limit native image rejection to the point where an image signal interferes unacceptably with the signal of interest.

In one instance, a method for calibrating a receiver using multiple tones includes deciding a number of calibration tones to use, determining a respective frequency for each of the number of calibration tones, and applying each respective calibration tone to the receiver to estimate a corresponding I/Q mismatch correction factor.

Assuming that the desired signal has a bandwidth (BW), with a lower frequency edge ($f_L$) and an higher frequency edge ($f_u$), one approach for determining the frequency for each calibration tone within a given BW is to subdivide the channel or frequency band into (N−1) equal sections, and to define a calibration tone for each edge defined by each sub-band as follows:

$$\left\{ \begin{array}{l} f_L; \frac{BW}{N-1} + f_L; 2*\frac{BW}{N-1} + \\ f_L; \ldots; (N-2)\frac{BW}{N-1} + f_L; f_u \end{array} \right\} \quad \text{(Equation 1)}$$

where N is the number of calibration tones. Thus, there are N equally spaced calibration tones within a channel.

In another approach, the calibration tones are non-uniformly distributed within a single channel or across an entire passband. For example, in RF environments where a desired signal expected at a particular frequency within a particular channel, the calibration tones can be distributed around the expected frequency in an approximately Gaussian distribution. In another approach, the calibration tones can be clustered around frequencies within the channel that are particularly susceptible to interference. For example, International Electrotechnical Commission report IEC 728-1 identifies a protection curve (sometimes referred to as a "w-curve") for avoiding picture impairments at certain frequencies within a television channel. In general, the protection curve shows that there are some frequencies within a television channel where unwanted signals do not disturb a picture as much as unwanted signals allocated at a carrier frequency of the channel. Therefore, in one embodiment, calibration tones can be clustered around frequencies that cause perceptible interference.

In many RF systems, it is often known that there are particular frequencies within a channel where unwanted (interfering) signals cause a relatively greater disturbance to the desired signal. In television channels, for example, it is well known that the human eyes and ears are especially sensitive to interference or noise that occurs at certain frequencies within a given channel. By placing a calibration tone at those frequencies, the perceptible disturbance caused by the interfering image signal can be minimized. Depending on the implementation, it may be desirable to distribute multiple calibration tones within a channel.

Different approaches may be used depending on characteristics of the desired signal and of the interference. In one approach, when a desired channel is an analog channel and the interfering signal is analog, it may be desirable to place calibration tones within the channel at locations corresponding to the image channel carrier frequencies, in order to cancel undesired interference at the carrier frequencies. In another approach, when a channel is analog and the interfering signal is digital, while the interference is spaced substantially evenly across the channel, the perceptibility of the interference is not spaced evenly across the channel. In such an instance, it may be desirable to space calibration tones evenly across the channel, or, alternatively, to space the calibration tones unevenly such that they are more densely positioned about those frequencies for which the human eyes and ears are most sensitive to interference. In another approach, when the channel is digital and the interference is digital, it may be desirable to place the calibration tones evenly across the channel. In some instances, the calibration tones can be positioned within the channel to correspond to the frequencies that cause the greatest disturbances to the desired signal. The processor 129 can be used to identify the desired approach and to select the frequencies of the calibration tones to fit the particular situation. By selecting the frequencies of the in-band calibration tones, the processor 129 positions the calibration tones within the channel as desired.

Another approach may be suitable for certain systems, which have non-uniform requirements across the bandwidth of interest. In this approach, the processor 129 can trigger the local oscillator 129 to generate a calibration tone at a particular frequency. For example, it may be desirable to place a calibration tone at a frequency that is particularly sensitive to image interference and/or at a frequency that may suffer larger image interference power. One example of this type of situation is a receiver adapted for use with broadcast television signals conforming to the analog television National Television Standards Committee (NTSC) signal standards. NTSC signal power is typically not distributed equally across a given 6 MHz channel (frequency band). Generally, most of the power is provided around the picture carrier frequency. Thus, most of the interfering image power is known to be located at the image channel's picture carrier frequency. In order to reduce the effects of image interference in such a system, a calibration tone can be placed at the frequency where the picture carrier of the image NTSC channel is expected. Since television channel plans are well defined in terms of the allowed picture carrier frequencies that may be broadcast within the frequency band, the calibration tone frequency can be chosen to correspond to the expected frequency of the interfering image from the image channel's picture carrier, based on information about the channel. In addition, other calibration tones may be chosen to correspond to the expected frequency of the interfering image from the image channel's sound carrier or color carrier, which also have significant energy. Finally, it is known that certain frequencies within a desired channel are more susceptible to interference than others, so calibration tones can be placed at those frequencies that are more susceptible to interference.

In one embodiment, the processor 129 is adapted to trigger an initial calibration sequence whereby the receiver scans through a plurality of channels to determine if a signal is present at the channel and to identify what type of signal (analog or digital) is present. This information can be used later to determine what type of placement scheme will be used to place the calibration tones. For example, if channel 27 and 29 are analog and channel 28 is digital, the receiver can make use of this information. If a user tunes to channel 15, the processor can insert an extra in-band calibration tone for the picture carrier, for example (to remove undesired interference with the picture carrier caused by channel 27). If the user tunes to a digital channel, then the calibration tones can be distributed across the channel.

I/Q Mismatch Calibration at a Selected Frequency

Generally, multiple calibration tones are used to provide I/Q mismatch estimation and compensation, one at a time or simultaneously, depending on the specific implementation and the resources available within the device to perform the calibration. For ease of discussion, one technique for performing calibration using a single tone is described; however, it should be understood that this technique can be extended to perform calibrations using one or more calibration tones based on any of the above-described approaches. Additionally, it should be understood that other calibration techniques can also be used with the plurality of tones.

Figure 3:
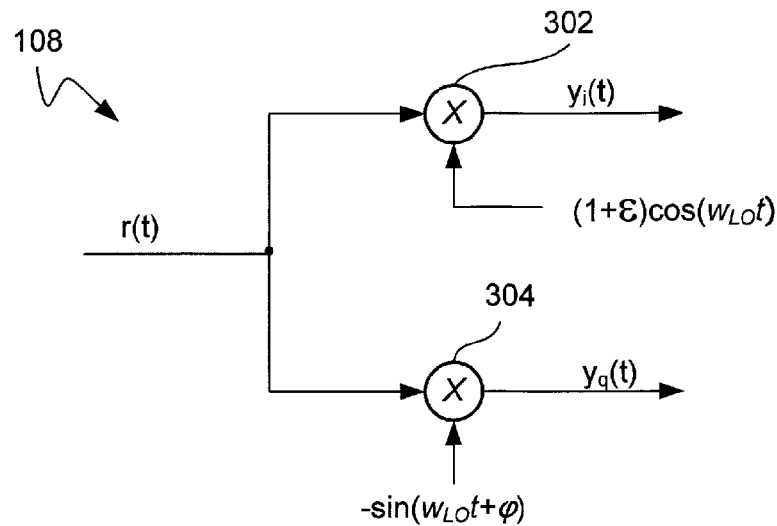
FIG. 3 is a simplified block diagram of a mixer illustrating how the I/Q mismatches are introduced in a quadrature mixer, which include both phase mismatch and gain mismatch.

FIG. 3 is a simplified block diagram of a mixer 108 illustrating how the I/Q mismatches are introduced in a quadrature mixer, which includes both a phase mismatch and a gain mismatch. For clarity, the gain mismatch (1+ε) is put into the in-phase path (cosine), and the phase mismatch (φ) is put into the quadrature path (sine). Within the mixer 108, a received signal r(t) is mixed (convolved) at nodes 302 and 304 with two signals at a predetermined frequency provided from a quadrature generator, such as quadrature generator 112 in FIG. 1. The received RF signal r(t) is mixed with the LO cosine function to generate $y_i(t)$ and with the LO sine function to generate $y_q(t)$. A complex IF signal output from the mixer 108 can be expressed as $y(t)=y_i(t)+j^*y_q(t)$. If the gain component is unity and the phase component is zero, then perfect image rejection is achieved through this quadrature mixer. However, in practical analog receivers, there is usually some mismatch, which results in limited image rejection through the quadrature mixer.

In a general signal reception scenario, a received signal includes both a desired signal and an image signal. Mathematically, the received signal is as follows:

$$r(t)=Re\{\tilde{S}(t)e^{j2\pi f_c t}\}+Re\{\tilde{A}(t)e^{j2\pi f_2 t}\},$$ (Equation 2)

where $f_{if}$ is a difference between the LO frequency and the desired signal carrier frequency, and where the first component is the desired signal and the second component is the image signal, $\tilde{S}$ represents a complex baseband signal of the desired signal, $f_c$ represents the carrier frequency of a desired signal, $\tilde{A}$ is a complex baseband signal of the image signal, and $f_2=f_c+f_{IF}$.

Figure 4:
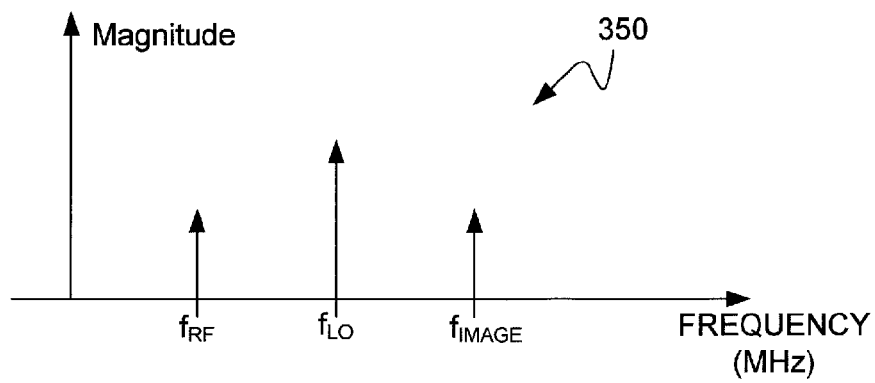
FIG. 4 is a simplified frequency domain graph illustrating a frequency of a received signal, a frequency of an image signal, and a frequency of a local oscillator signal according to one possible embodiment.

FIG. 4 is a simplified frequency domain graph 350 illustrating a frequency of a received signal ($F_{RF}$), a frequency of an image signal ($f_{IMAGE}$), and a frequency of a local oscillator signal ($f_{LO}$) according to one possible embodiment. In this instance, the local oscillator frequency is positioned between the image signal frequency and the received signal frequency.

Figure 5:
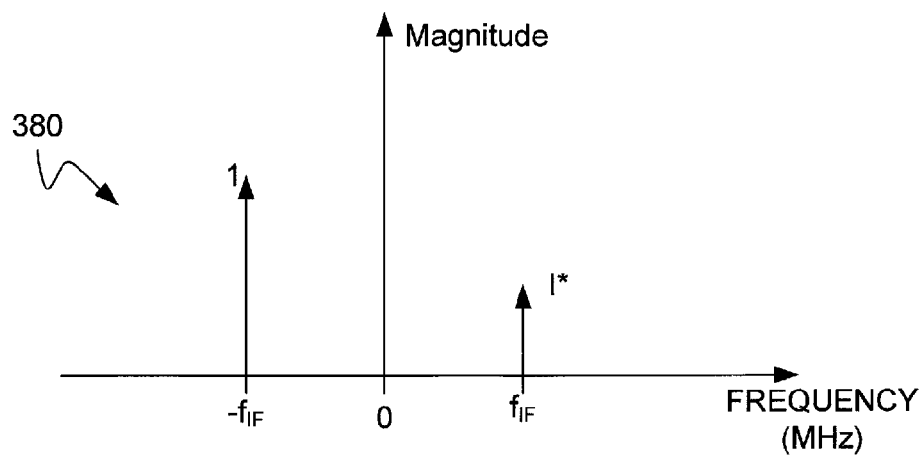
FIG. 5 is a simplified frequency domain graph illustrating a spectrum of the quadrature LO signal applied to the LO port of the quadrature mixer.

FIG. 5 is a simplified frequency domain graph 380 illustrating possible IF outputs of a receiver system before application of an image correction process according to an embodiment of the present invention. In general, the image frequency is defined as follows:

$$w_{IMAGE}=w_c+2w_{IF}$$ (Equation 3)

Hence, after down conversion with the LO signal, the desired signal and the image signal mirror one another on opposite sides of DC. In the illustrated example, the desired signal is at a negative frequency, while the image signal is at a positive frequency. In general, the received signal r(t) is down-converted to an intermediate signal y(t), where the intermediate signal is as follows:

$$y(t)=r(t)\cdot LO(t)$$ (Equation 4)

such that the intermediate signal is defined as follows:

$$y(t)=[Re\{\tilde{S}(t)e^{j2\pi f_c t}\}+Re\{\tilde{A}(t)e^{j2\pi f_c t}e^{j2\pi f_{if} t}\}]\cdot[(1\epsilon)\cos(w_{LO}t)-j\sin(w_{LO}t+\phi)]$$ (Equation 5)

where ε represents a gain mismatch. The output signal y(t) can be simplified as follows:

$$y(t)=[\tilde{S}(t)e^{-jw_{IF}t}+I\tilde{S}^*(t)e^{jw_{IF}t}]+\tilde{A}(t)e^{jw_{IF}t}+I\tilde{A}^*(t)e^{-jw_{IF}t},$$ (Equation 6)

Where $w^{IF}$ corresponds to the intermediate frequency, and the factor (I) is as follows:

$$I=\frac{1+\varepsilon-e^{j\varphi}}{1+\varepsilon+e^{-j\varphi}}.$$ (Equation 7)

The resultant signals can be plotted on a frequency line as shown in FIG. 5. The local oscillator signal can be as follows:

$$LO(t)=(1+\epsilon)\cos(w_{LO}t)-j^*\sin(w_{LO}t+\phi).$$ (Equation 8)

The equation for the local oscillator signal can be simplified as follows:

$$LO(t)=e^{-jw_{LO}t}+\frac{1+\varepsilon-e^{j\varphi}}{1+\varepsilon+e^{j\varphi}}e^{jw_{LO}t}$$ (Equation 9)
$$=e^{-jw_{LO}t}+Ie^{jw_{LO}t},$$
where $I=\frac{1+\varepsilon-e^{j\varphi}}{1+\varepsilon+e^{j\varphi}}.$ The mathematical function of the I/Q mixer 108 suggests that if the native image rejection factor (I) could be reduced to approximately zero, mixing of image signals onto signals of interest would be reduced. In some instances, it may be possible to reduce image signals by directly reducing the phase and gain mismatches of the various components in the I and Q signal paths that tend to increase I. In other embodiments, native image rejection factor I may be reduced mathematically by applying a correction factor.

I/Q mismatch calibration/correction subsystem 102 measures the residual image associated with the I and Q signals when each calibration tone is applied to the system. Based on the measured residual image, I/Q mismatch calibration/correction subsystem 102 determines one or more correction parameters that may be used for further reducing the residual image signal. I/Q mismatch calibration/correction subsystem 102 may perform this function in various ways, depending upon the implementation. For example, in one embodiment, during a calibration mode of operation, DSP 122 may be configured to execute computer readable instructions stored within memory 124 that implement algorithms to measure the residual image signal and to determine a correction parameter in the form of a correction factor that may be applied mathematically to the I and Q signals output from ADCs 118 and 120. The correction factor may be chosen such that analog gain and phase mismatches in the I and Q signal paths are compensated, mathematically, to reduce mismatches to approximately zero. Subsequently, during the normal mode of operation when an incoming modulated RF signal is provided to I/Q mixer 108 through switch 106, the determined correction factor may be similarly applied to the I and Q signal output from ADCs 118 and 120 to provide improved cancellation of the image signal. One suitable implementation of a calibration and correction subsystem is described in co-pending U.S. patent publication no. 2005/0070236 entitled "Apparatus And Method For Deriving a Digital Image Correction Factor In A Receiver," which is hereby incorporated by reference in its entirety.

In alternative embodiments, the residual image frequencies may be reduced or canceled directly by adjusting the gain and/or phase characteristics of one or both of the analog I and Q signal paths. For example, during a calibration mode of operation, the I/Q mismatch calibration/correction subsystem 102 may be configured to measure a residual image associated with the I and Q signals when a calibration tone is applied to the system. Based on the measured residual image, I/Q mismatch calibration/correction subsystem 102 determines one or more correction parameters (such as gain and/or phase characteristics) for one or both of the signal paths.

Figure 6:
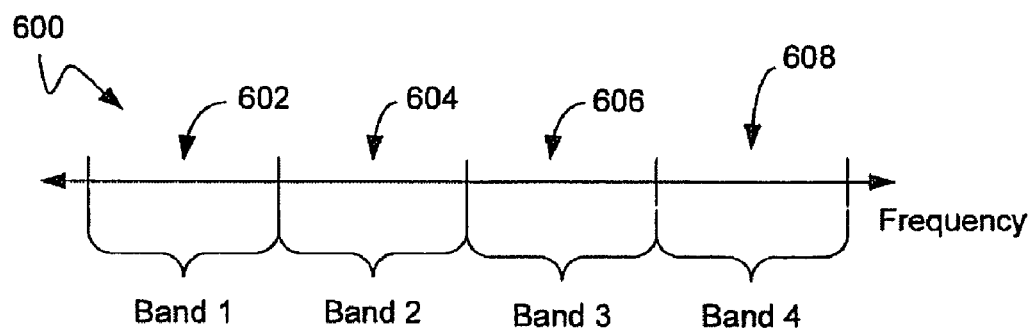
FIG. 6 is a simplified frequency domain graph illustrating division of the frequency domain into multiple signal channels.

FIG. 6 is a simplified frequency domain graph 600 illustrating division of the frequency domain into multiple channels. One example is the United States cable television band from 54 MHz to 864 MHz, which is divided into 135 television channels. Each of the 135 television channels has a bandwidth of approximately 6 MHz. In this illustration, only four bands 602, 604, 606, and 608 are shown, but it should be understood that a passband of a receiver can be subdivided into any number of bands.

Figure 7:
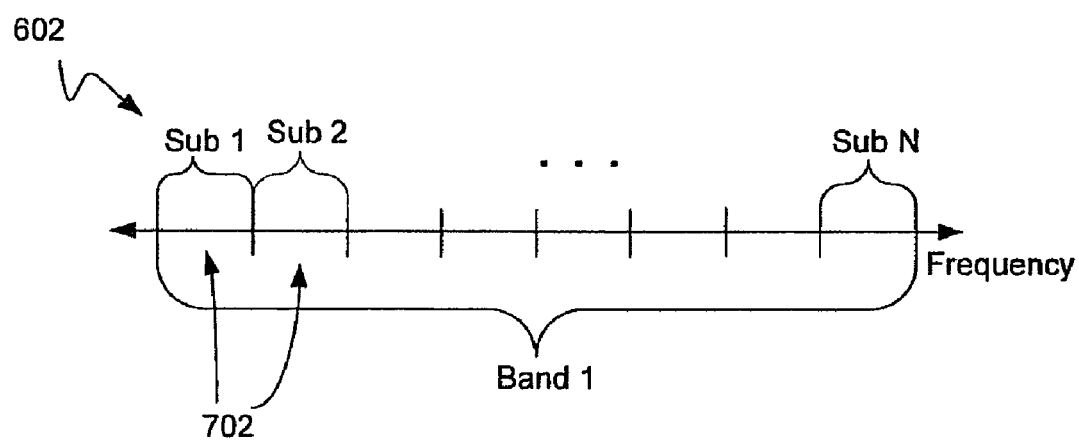
FIG. 7 is a simplified frequency domain graph illustrating division of one of the bands into a plurality of sub-bands.

FIG. 7 is a simplified frequency domain graph 700 illustrating division of one of the bands 602 into a plurality of sub-bands 702. In general, each band or channel can be subdivided into any number of sub-bands.

In a television setting, for example, each band or channel 602, 604, 606, and 608 may represent a frequency range within which video and audio signals are coded for transmission. In such an instance, band 1 602, for example, could correspond to a channel 2 setting on a television set. In a different implementation, a data transmission may span several bands, each of which may be subdivided into sub-bands, such as sub-band 702.

In the context of multiple calibration tones as discussed above, calibration tones can be generated for each band, for each sub-band, or for multiple frequencies within a sub-band. During operation, the processor 129 can select an I/Q mismatch correction factor corresponding to a received signal based on a closest calibration frequency. If no calibration frequency matches, the received signal can be processed or interpolated from available data.

Figure 8:
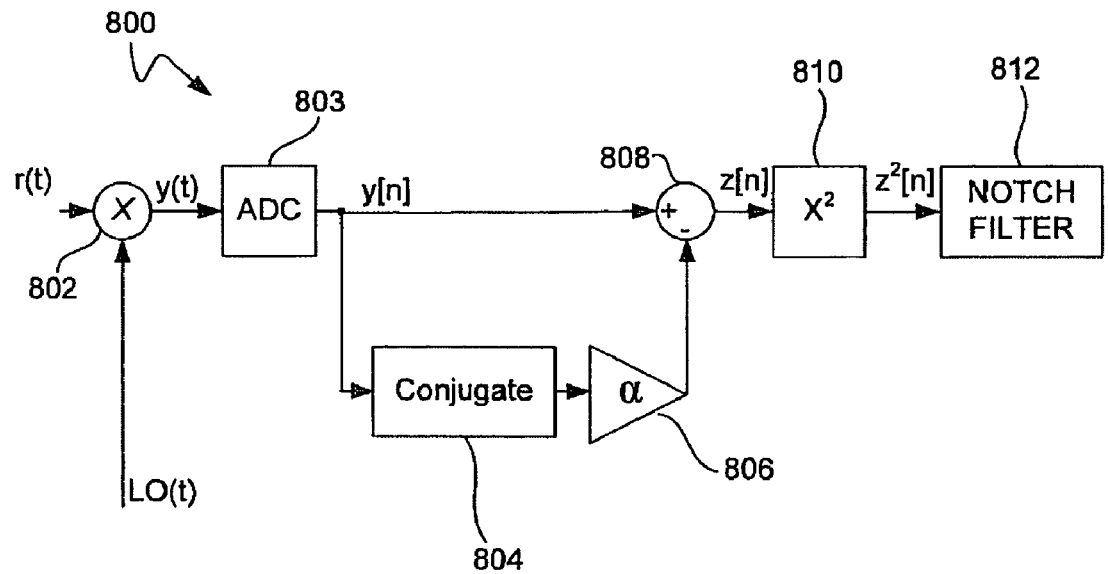
FIG. 8 is a simplified block diagram of a narrow band I/Q mismatch estimation system within a receiver.

FIG. 8 is a simplified block diagram of a narrow band I/Q mismatch estimation system 800 within a receiver. In this embodiment, the system 800 estimates an image rejection factor using a calibration tone that contains only a single sine wave at the desired signal frequency. In this instance, a received signal r(t) is mixed with a local oscillator signal LO(t) at block 802 to produce an intermediate signal y(t). The intermediate signal y(t) is converted from an analog to a digital signal by analog-to-digital converter 803 into a digital version of the intermediate signal y[n]. Subsequent processing of the intermediate signal y[n] occurs in the digital domain. For consistency, continuous time signals are indicated by (t) representing time, and equations 1-9 above are given as continuous time equations. However, after the continuous time signal is processed by an analog-to-digital filter 803, the resulting digital signals are indicated by [n] representing a discrete sample. The equations below are provided in digital form. However, it should be understood that processing could be performed on either analog or digital signals, and the equations are valid for both digital and analog signal processing. The following equations can be applied to analog signals by replacing [n] with (t).

A copy of the intermediate signal y[n] is conjugated at block 804, and scaled by the I/Q mismatch correction factor at block 806. The conjugated and scaled signal is then subtracted at block 808 from the intermediate signal y[n] to produce a signal z[n]. Generally, the signal z[n] is defined as follows:

$$z[n]=y[n]-\alpha y^*[n]=[\tilde{S}[n]e^{-jw_{IF}n}+I\tilde{S}^*[n]e^{jw_{IF}n}]-\alpha[\tilde{S}^*[n]e^{jw_{IF}n}+I^*\tilde{S}^*[n]e^{-jw_{IF}n}]z[n]=$$
$$(1-\alpha I^*)\tilde{S}[n]e^{-jw_{IF}n}+(I-\alpha)\tilde{S}^*[n]e^{jw_{IF}n} \quad \text{(Equation 10)}$$

The signal z[n] is then squared at block 810 to produce a signal $z^2(t)=z[n]^*z[n]$. The signal $z^2(t)$ can be represented as follows:

$$z^2[n]=(1-\alpha I^*)^2\tilde{S}^2[n]e^{-jw2Fn}+(1-\alpha)^2\tilde{S}^*[n]^2e^{j2w_{IF}n}+2(1-\alpha I)(I-\alpha)\tilde{S}[n]\tilde{S}^*[n] \quad \text{(Equation 11)}$$

The signal $z^2[n]$ is filtered using a notch filter 812 having zeros at $2w_{IF}$, and the resulting signal may contain the power (P) around DC as follows:

$$P[n]=2(1-\alpha I^*)(I-\alpha)|\tilde{S}[n]|^2 \quad \text{(Equation 12)}$$

With reasonable I/Q matching, the in-phase (I) component is generally speaking very small such that |I|<<1. It is thus possible to design an adapted loop to estimate the I/Q mismatch correction factor (α) such that $$(1-\alpha I^*)(I-\alpha)|\tilde{S}[n]|^2=0. \quad \text{(Equation 13)}$$

Then $\alpha=\hat{I}$ is an estimate of the in-phase component (I).

The estimate of native mismatch I at each selected calibration frequency can be used to construct a filter to conduct a wideband frequency dependent compensation. For narrow band signals, with a calibration error estimate of I/Q mismatch at one frequency, a reasonable assumption is that the I/Q mismatch is the same across the entire signal band.

Figure 9:
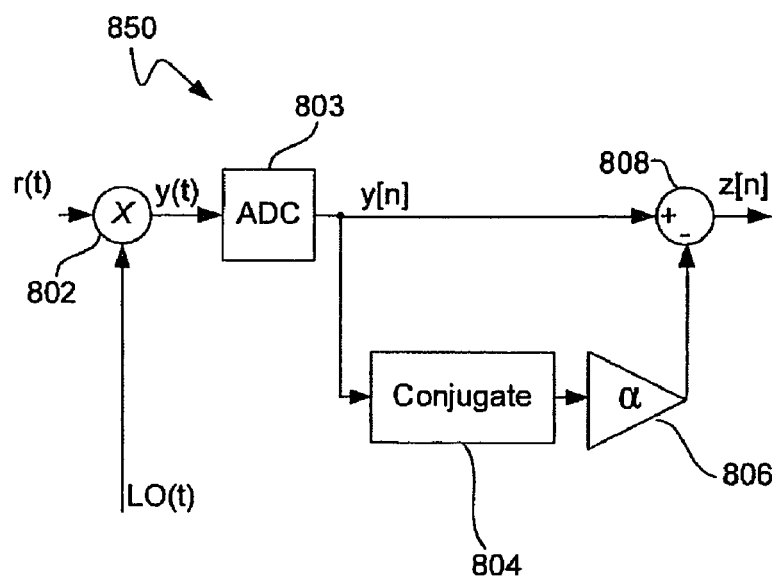
FIG. 9 is a simplified block diagram of a narrow band I/Q mismatch correction system within a receiver.

FIG. 9 illustrates a narrow band I/Q mismatch correction system 850, which utilizes components of the I/Q mismatch estimation system 800 to reject undesired image interference. In this instance, a received signal r(t) is mixed at node 802 with a LO signal LO(t) to produce an intermediate signal y(t). The signal y(t) is converted to a digital signal y[n] using the analog-to-digital converter 803. The digital signal y[n] is then conjugated in block 804 and scaled by a factor (α), and the result is then subtracted at node 808 from the digital signal y[n] to produce a corrected output signal z[n]. In general, equations 14-17 below are related to the I/Q mismatch compensation system.

The I/Q mismatch compensation can be completed as follows:

$$y[n]=[\tilde{S}[n]e^{-jw_{IF}n}+I\tilde{S}^*[n]e^{jw_{IF}n}]+[\tilde{A}[n]e^{jw_{IF}n}+I\tilde{A}^*[n]e^{-jw_{IF}n}] \quad \text{(Equation 14)}$$

Then, the conjugate of y[n] can be scaled and subtracted from y[n] as follows:

$$\text{Difference signal}=y[n]-\alpha y^*[n] \quad \text{(Equation 15)}$$

such that $$\text{Difference signal} = (1-\alpha I^*)\tilde{S}[n]e^{-jw_{IF}n} + (I-\alpha)\tilde{A}^*[n]e^{-jw_{IF}n} \quad \text{(Equation 16)}$$

With a good estimate, $\alpha=I$, and $|I^*| \ll 1$ such that the difference signal contains only the information of the desired signal $\tilde{S}[n]$, and the image channel information is suppressed such that $$\text{Difference signal} = (I-\alpha)\tilde{A}^*[n] = (I-\hat{I})\tilde{A}^*[n]. \quad \text{(Equation 17)}$$

This type of single tone estimation/compensation scheme is applicable to a multi-tone calibration system.

Wideband Calibration

Designing and/or constructing a filter that can do wideband I/Q mismatch calibrations requires a number of assumptions. These assumptions are true for both wideband and narrowband calibration, both of which can be performed digitally, after an ADC. A plurality of calibration tone frequencies $\{f_1, f_2, \ldots, f_N\}$, where N represents a number of calibration tones, is provided. Finally, it is assumed that a I/Q mismatch correction factor can be derived using the calibration tone frequencies ($f_i$) to estimate $\alpha_n = \hat{I}_n$, for n=1, 2, ..., N.

From calibration tone frequencies ($f_i$) and mismatch estimates ($\hat{I}_n$) providing pairs $\{(f_1, \hat{I}_1), (f_2, \hat{I}_2), \ldots, (f_N, \hat{I}_N)\}$, a digital filter can be constructed according to the following formula:

$$\hat{I}(z) = \sum_{n=1}^{N} \frac{\prod_{m=1}^{N}(z^{-2} - 2\cos w_m z^{-1} + 1)}{\prod_{m=1}^{N} 2(\cos w_m - \cos w_n)} \cdot \hat{I}_n, \quad \text{(Equation 18)}$$

where $m \neq n$ and where $$w_m = 2\pi \frac{f_m}{f_s} \text{ and } z = e^{jw}.$$

In general, a filter $\hat{I}(z)$ can be constructed such that the filter is a finite impulse response (FIR) filter of order $2(N-1)$. Moreover, the filter coefficients of filter $\hat{I}(z)$ are symmetric around $Z^{-(N-1)}$, such that $$\hat{I}(f_n) = Z^{-(N-1)} \cdot \hat{I}_n, \quad \text{(Equation 19)}$$

where $f_n$ and $I_n$ represent the I/Q mismatch estimation pairs described above, and where the frequency (f) is equal to ($f_n$) for n=1, 2, ... N.

Figure 10:
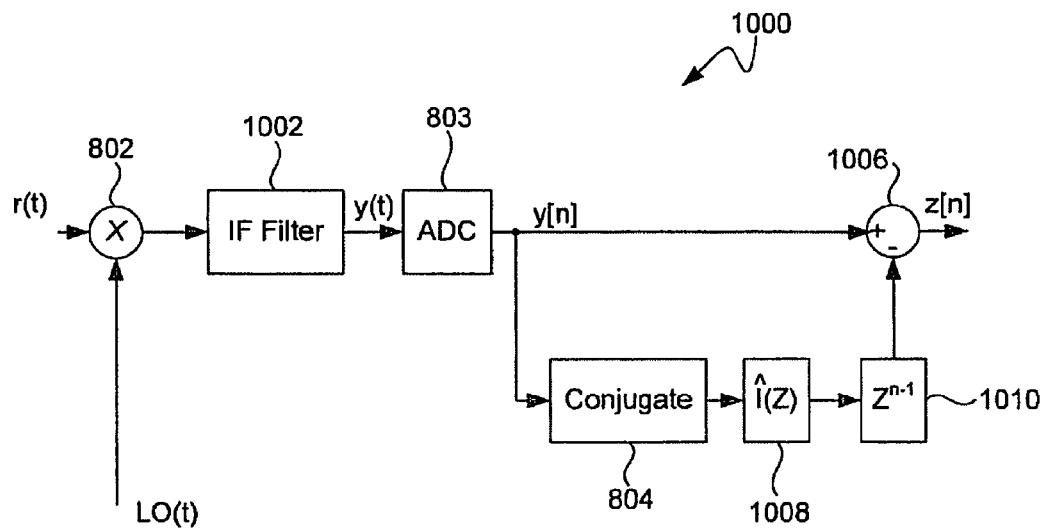
FIG. 10 is a simplified block diagram of a wideband I/Q mismatch correction system within a receiver.

FIG. 10 is a simplified block diagram of a wideband I/Q mismatch correction system 1000 for use within a receiver. The I/Q mismatch correction system 1000 is similar to that shown in FIG. 8, except that the scalar ($\alpha$) 806 is replaced by an FIR filter $\hat{I}(z)$ 1008. A received signal r(t) is provided at multiplying node 802 along with a local oscillator signal. The combined signal y(t) is passed through IF filter block 1002 and through an ADC filter 803 to produce an intermediate signal y[n], which is a discrete-time signal. The intermediate signal y[n] is passed to summing node 1006. Additionally, the intermediate signal y[n] is conjugated in block 804 and filtered by the digital FIR filter $\hat{I}(f_n)$ 1008. An extra delay ($Z^{N-1}$) 1010 is added before summing node 1006 to account for a group delay of the FIR filter 1008. The conjugated, filtered, and delayed signal is then subtracted from the intermediate signal y[n] at node 1006 to produce output signal z[n]. The output signal is defined as follows:

$$z[n] = y[n] - \text{filter}(y^*[n], \hat{I}(z)) \quad \text{(Equation 20)}$$

In practice, the sampling frequency ($f_s$) of the ADC filter 1004 is generally known. A number of calibration tones (N) can be decided based on the signal spectrum shape and on signal quality requirements. The corresponding frequency of the calibration tones could be decided to be $f_1, f_2, \ldots, f_N$, or $w_1, w_2, \ldots, w_N$, or further $\cos w_1, \cos w_2, \ldots, \cos w_N$.

The numerator of equation 18 above can be represented by the following vector:

$$[1 -2 \cos w_m\ 1]. \quad \text{(Equation 21)}$$

The coefficients of the numerator $$\prod_{m=1, m \neq n}^{N}(z^{-2} - 2\cos w_m z^{-1} + 1) \quad \text{(Equation 22)}$$

can be precalculated as a convolution of the vectors associated with all of the calibration tones as follows:

$$[1-2\cos w_1\ 1] \otimes [1-2\cos w_2\ 1] \otimes \ldots \otimes [1-2\cos w_N\ 1] = \lfloor A_{n_1}, A_{n_2}, \ldots, A_{n_{2N-1}} \rfloor \quad \text{(Equation 23)}$$

The denominator of equation 16 can also be precalculated and saved as $b_n$.

Hence, N-pairs of information are precalculated and stored as follows:

$$(\lfloor A_{n_1}, A_{n_2}, \ldots, A_{n_{(2N-1)}} \rfloor, b_n) \quad \text{(Equation 24)}$$

for n=1, 2, ..., N. Once the I/Q mismatch estimation $\hat{I}_n$ has been determined using the calibration tone ($f_n$) the filter coefficients (in vector form) of the wideband I/Q mismatch compensation filter $\hat{I}(z)$ can be constructed as follows:

$$\hat{I}(z) = \frac{\lfloor A_{n_1}, A_{n_2}, \ldots A_{n_{(2N-1)}} \rfloor}{b_n} \cdot \hat{I}n \quad \text{(Equation 25)}$$

with minimal circuit operation.

Figure 11:
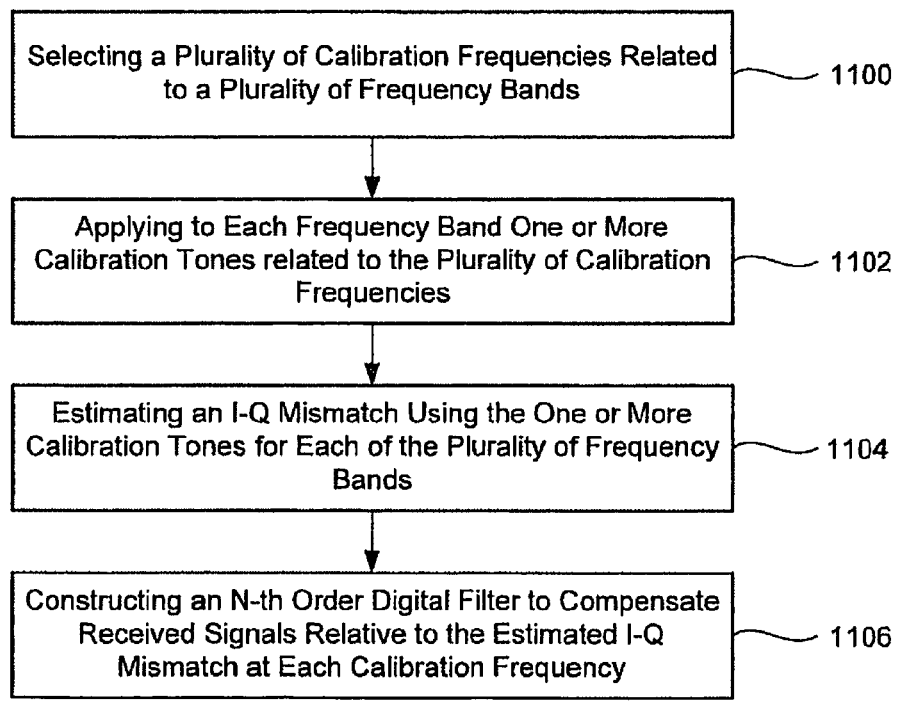
FIG. 11 is a simplified flow diagram of a process for calibrating a receiver using multiple calibration tones according to one possible embodiment of the present invention.

FIG. 11 is a simplified flow diagram of a process for calibrating a receiver using multiple calibration tones according to one possible embodiment of the present invention. A plurality of calibration frequencies related to a plurality of frequency bands are selected (step 1100). One or more calibration tones related to the plurality of calibration frequencies are applied to each frequency band (step 1102). An I/Q mismatch is estimated for each of the plurality of frequency bands using the one or more calibration tones (step 1104). An n-th order digital filter is constructed to compensate received signals relative to the estimated I/Q mismatch at each calibration frequency (step 1106), such as the mismatch compensation filter constructed using Equation 25 above.

Figure 12:
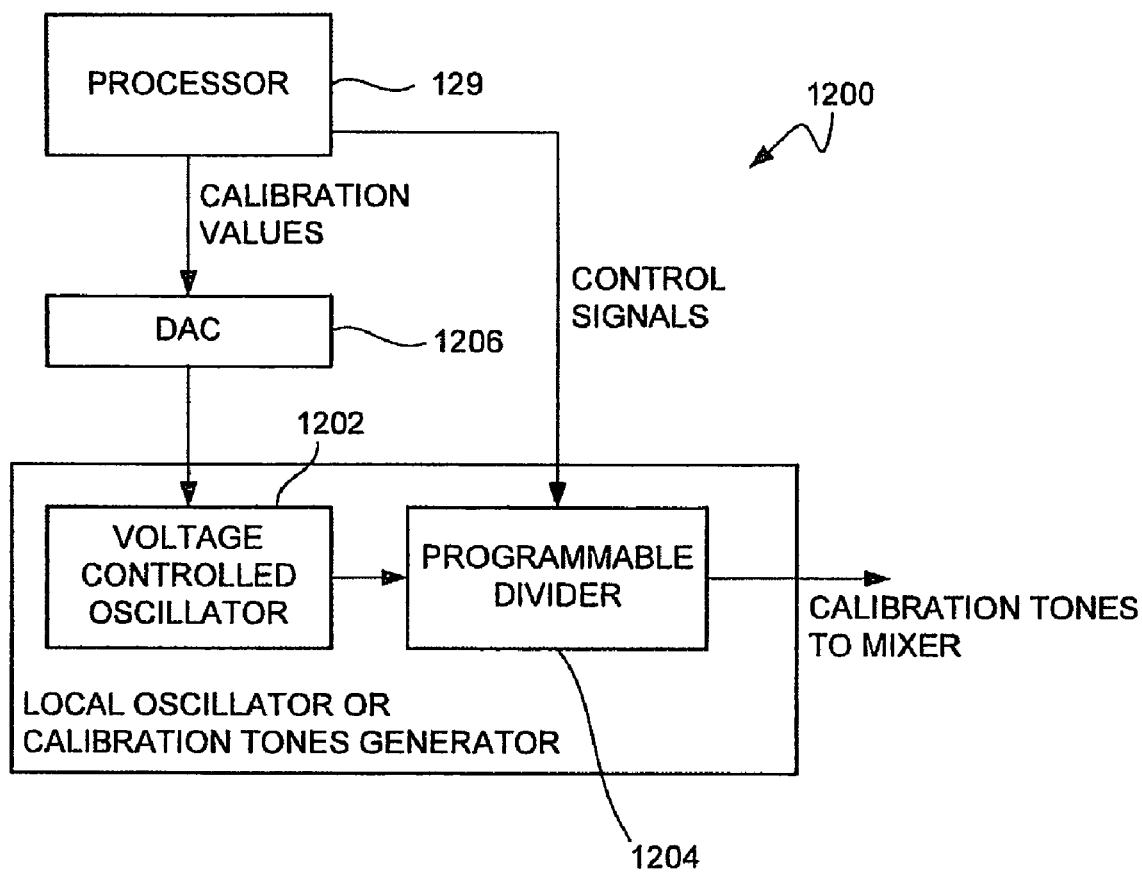
FIG. 12 is a simplified block diagram of a signal generator for producing calibration tones at various frequencies.

FIG. 12 is a simplified block diagram of a calibration tones generator 1200 for producing calibration tones at various frequencies according to one possible embodiment. The calibration tones generator 1200 includes a voltage controlled oscillator (VCO) 1202 and a programmable divider 1204. Divider 1204 is a programmable divider adapted to produce calibration tones for use by the mixer 108 in FIG. 1.

In one embodiment, the calibration tones generator 1202 is adapted to receive control signals (such as calibration values) from a processor 129 through digital-to-analog converter 1206. The processor 129 can trigger generation of calibration tones at particular frequencies by sending control signals to the VCO 1202 and by adjusting the programmable divider 1204 using control signals, and so on. In one embodiment, processor 129 can position in-band calibration tones within a channel uniformly, non-uniformly, in a Gaussian-type distribution, or in any number of different arrangements, depending on the type of interference, the information available about the channel, and so on. The processor 129 is adapted to determine a channel type (e.g. analog or digital) of the desired channel, to determine a type of interference (e.g. analog or digital), and to select calibration tones and an appropriate distribution for the calibration tones based on the determined channel type and interference type.

Figure 13:
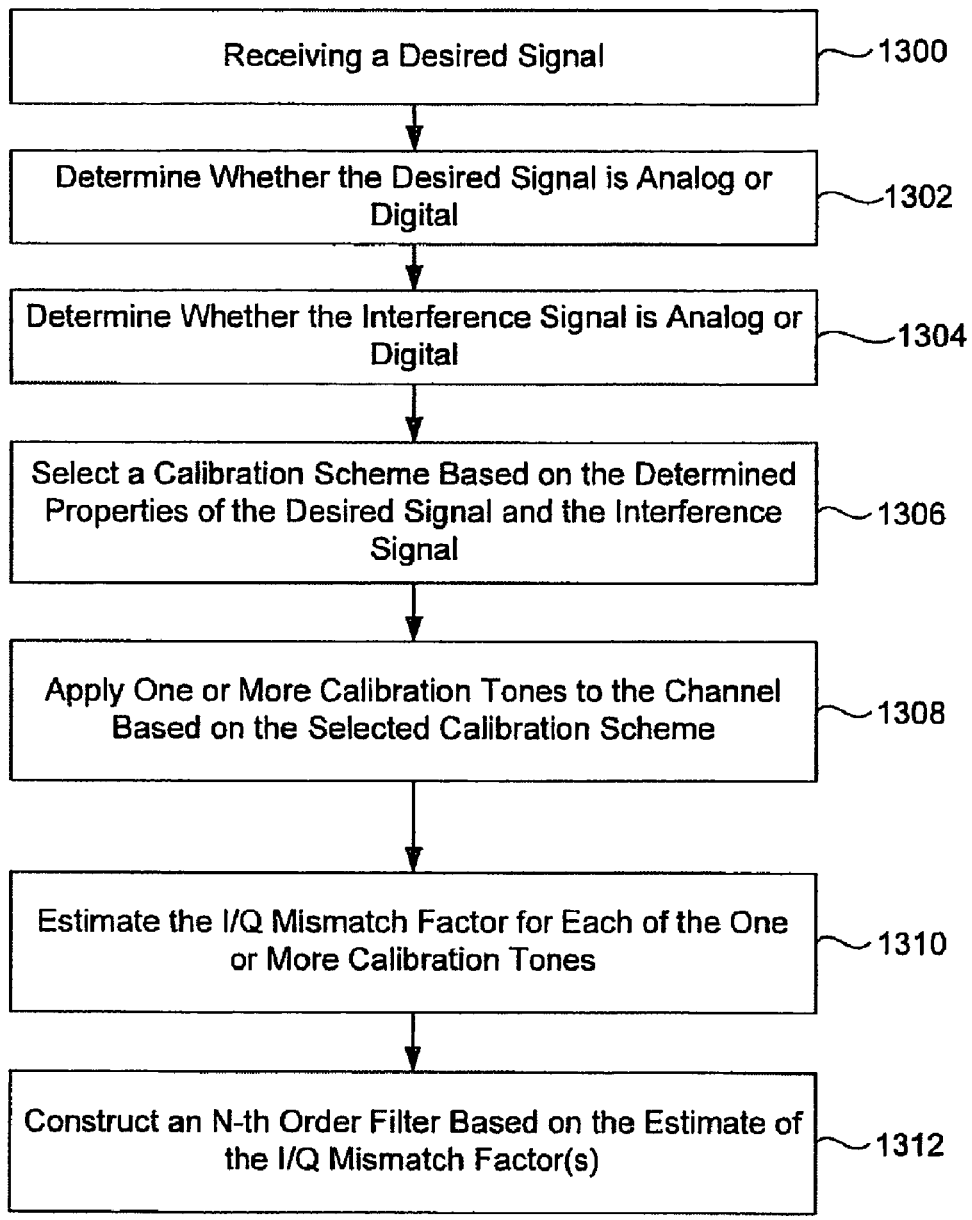
FIG. 13 is a simplified block diagram of a process for estimating an I/Q mismatch correction factor within a receiver according to attributes of a desired signal and an interfering signal.

FIG. 13 is a simplified block diagram of a process for estimating an I/Q mismatch correction factor within a receiver according to attributes of a desired signal and an interfering signal. A desired signal is received (step 1300). A processor, such as processor 129 in FIG. 1, determines whether the desired signal is an analog or a digital signal (step 1302). The processor determines whether the interference signal is analog or digital (step 1304). The processor selects a calibration scheme based on the determined properties (analog or digital) of the desired signal and the interference signal (step 1306). One or more calibration tones are applied to the channel based on the selected calibration scheme (step 1308). The I/Q mismatch correction factor is estimated for each of the one or more calibration tones (step 1310). An n-th order filter is constructed based on the estimated I/Q mismatch correction factor (step 1312). It should be understood by a worker skilled in the art that the various steps illustrated in FIG. 13 can be combined or re-ordered, depending on the implementation. For example, steps 1302 and 1304 can be combined into a single step or the order can be reversed, as desired.

While the depicted embodiments include various components, it is contemplated that other devices capable of measuring the residual image signal and determining one or more correction parameters to further reduce the image signal during the calibration mode may be employed in other embodiments. For example, the functions and algorithms of I/Q mismatch calibration/correction subsystem 102 as described above may be implemented using other types of devices, such as general-purpose microprocessors, application-specific integrated circuits (ASICs), or hard-coded custom logic. Still further, embodiments of I/Q mismatch calibration/correction subsystem 102 are possible in which a residual image signal during the calibration mode is measured using analog techniques. Such embodiments of receiver system 100 may omit ADCs 118 and 120. Alternatively, they may be provided in a single integrated ADC.

The particular frequencies at which receiver local oscillator (RX LO) signal, calibration signal, and calibration tones are generated may vary depending upon the implementation. The frequencies of these signals may further depend upon an operating mode of the receiver system. For example, in one embodiment, receiver system 100 may be used in an RF receiving device operable to receive broadcast television (coded video/audio) signals. As such, receiver system 100 may operate across a wide frequency range with wide channel widths and relatively narrow spacings between channels. As described above, unfiltered image signals present in the frequency spectrum (which may correspond to adjacent channel signals) may be translated into the IF spectrum. Accordingly, during the calibration mode, calibration tones may be generated at specific frequencies corresponding to frequencies where interference is expected. Programmable divider 1206 may be set to perform a divide by N function to provide the desired output frequency.

While the above-discussion has largely been directed to multi-tone calibration, one possible variation involves the selection of a calibration tone that matches a frequency of an undesired carrier signal. Theoretically, calibration tone frequencies could be chosen arbitrarily. However, one could make use of the algorithm to choose a calibration tone frequency intelligently to improve rejection of real-world interference. For example, in a television tuner, by using knowledge about the pre-defined frequency plan related to television broadcasting frequencies, it is possible to identify, relative to desired signals, undesired signals that are likely to interfere with the desired signals. By choosing the calibration tones to be at the frequency of the undesired signals, the system improves the received signal quality in the calibration tone based I/Q mismatch approach without adding any implementation complexity.

Instead of adding complexity, the targeted calibration tone approach constrains the choice of calibration frequency with consideration of the frequency plan of the interfering image signals. In a tone-based I/Q mismatch compensation calibration algorithm, I/Q mismatch compensation is usually the best at the frequency of the calibration tone because the mismatch estimate is conducted at that frequency. An analog television signal has a strong picture carrier component due to a modulation scheme of a corresponding transmitter, such as vestigial sideband amplitude modulation. Subjective signal quality of analog television signals in the existence of in-band tones is highly dependent on the tones. In other words, the sensitivity of the analog television signal quality to the in-band tones is frequency dependent. Broadcast analog television uses known frequency plans. Therefore, the interfering tone from the picture carrier of the image channel will typically be located at a known frequency with respect to the desired channel. Putting the calibration tone at the image picture carrier frequency may help to maximally attenuate the picture carrier of the image channel. Since the picture carrier is the strongest interference component from the image channel, a good choice of a calibration frequency in an I/Q mismatch compensation calibration algorithm is the frequency at which the picture carrier of the image frequency falls.

Thus, in an alternative embodiment, an error correction and calibration subsystem is adapted to generate a calibration tone at a specific frequency corresponding to a frequency of an undesired carrier signal. In one embodiment, the calibration tone is at a specific frequency corresponding to the image carrier frequency of the undesired carrier signal. The correction and calibration subsystem is adapted to estimate an image correction error based on the calibration tone, and to use the image correction error to reject image interference in received signals within a particular frequency band.

The calibration tone selection process can also be used within the multi-tone system by producing at least one calibration tone within each pre-defined frequency band at a pre-determined frequency of an interference carrier signal that commonly produces interference with the desired channel. This tone can be produced for each channel of the entire passband of the receiver, if so desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising:
   selecting a plurality of calibration frequencies having a predetermined distribution within a channel;

applying to the channel a calibration tone at each of the plurality of calibration frequencies;

estimating an I/Q mismatch at each of the plurality of calibration frequencies;

constructing an n-th order digital filter to compensate received signals relative to the estimated I/Q mismatch related to each calibration frequency and subsequently receiving a radio frequency (RF) input signal and recovering information from the channel by applying the n-th order digital filter.

2. The method of claim 1, wherein the step of constructing further comprises:

constructing the n-th order finite impulse response filter to interpolate the received signals at frequencies between the calibration frequencies according to the I/Q mismatches at adjacent calibration frequencies.

3. The method of claim 1, further comprising:

generating the calibration tone at each of the plurality of calibration frequencies using a local oscillator.

4. The method of claim 1, further comprising:

generating the calibration tone at each of the plurality of calibration frequencies using a calibration tones generator.

5. The method of claim 1, wherein the nth order digital filter interpolates the received signals at frequencies between the calibration frequencies by averaging the I/Q mismatches at adjacent calibration frequencies and by compensating the received signals according to the averaged I/Q mismatch.

6. The method of claim 1, wherein the step of selecting comprises:

dividing a channel bandwidth (BW) with a lower frequency edge (fL) and a upper frequency edge (fu) into (n−1) equal sections; and setting a plurality of calibration tones, each calibration tone having a respective frequency corresponding to an approximate endpoint of a respective frequency interval for all frequency intervals between fL to fu.

7. The method of claim 6, wherein each respective frequency interval corresponds to a sub-bandwidth of the channel bandwidth (BW) divided into (n−1) equal sections.

8. The method of claim 6, wherein the respective frequency intervals are distributed about a midpoint of the channel in a Gaussian distribution.

9. A receiver circuit for use in multi-channel systems, the receiver circuit comprising:

a calibration signal generator adapted to generate a calibration tone at each of a plurality of selected frequencies having a predetermined distribution within a channel;

a processor coupled to the calibration signal generator and adapted to estimate an I/Q mismatch error at each of the selected frequencies;

a receive signal path for receiving a radio frequency (RF) input signal and providing a processed signal; and a digital filter coupled to the receive signal path and to the processor and adapted to compensate the processed signal relative to the I/Q mismatch error at each selected frequency.

10. The receiver circuit of claim 9, wherein the calibration signal generator is adapted to provide a digital signal comprising in-phase (I) and quadrature (Q) components.

11. The receiver circuit of claim 9, the calibration signal generator selects the selected frequencies of the calibration tones by dividing a bandwidth of the channel into (n−1) sub-intervals and by modulating a respective calibration tone to approximately a midpoint frequency of each respective sub-interval.

12. The receiver circuit of claim 11, wherein the (n−1) sub-intervals are evenly distributed across the bandwidth of the channel.

13. The receiver circuit of claim 11, wherein the (n−1) sub-intervals are distributed across the bandwidth of the channel in a Gaussian distribution about a midpoint frequency of the channel.

14. The receiver circuit of claim 9, wherein the processor is adapted to interpolate an I/Q mismatch error for frequencies between the selected frequencies based on the estimated I/Q mismatch errors.

15. The receiver circuit of claim 9, further comprising:

a memory coupled to the processor and adapted to store the estimated I/Q mismatch errors.

16. A receiver circuit for use in multi-channel communication systems, the receiver circuit comprising:

a calibration circuit adapted to receive calibration tones at each of a plurality of calibration frequencies having a predetermined distribution within a channel and to estimate an I/Q mismatch error corresponding to a respective frequency interval for each calibration tone, each calibration tone comprising an in-phase component and a quadrature component, the calibration circuit adapted to calculate a complex image correction factor for each respective frequency interval;

a receive signal path for receiving a radio frequency (RF) input signal and providing a processed signal; and a digital filter adapted to select a complex correction factor related to a calibration tone within a particular frequency interval corresponding to a frequency of received signal and to combine the selected complex correction factor with the processed signal.

17. The receiver circuit of claim 16, wherein the calibration circuit further comprises:

a calibration signal generator coupled to the channel and adapted to generate the plurality of calibration tones at selected frequencies; and a processor coupled to the channel and adapted to estimate the I/Q mismatch error at each of the selected frequencies.

18. The receiver circuit of claim 17, wherein the digital filter is coupled to the channel and to the processor and is adapted to compensate received signals relative to the I/Q mismatch error at each calibration frequency.

19. The receiver circuit of claim 16, wherein the calibration circuit further comprises:

a signal generator adapted to select frequencies of the calibration tones by dividing a bandwidth of a channel into (n−1) sub-intervals and by modulating a respective calibration tone to approximately a midpoint frequency of each respective sub-interval.

20. The receiver circuit of claim 19, wherein the (n−1) sub-intervals are substantially evenly distributed across the bandwidth of the channel.

21. The receiver circuit of claim 19, wherein the (n−1) sub-intervals are distributed across the bandwidth of the channel in a substantially Gaussian distribution about a midpoint frequency of the channel.

22. The receiver circuit of claim 19, further comprising:

a memory associated with the calibration circuit and coupled to the digital filter, the memory adapted to store the estimated I/Q mismatch errors.

* * * * *